(12) United States Patent
Devalla et al.

(10) Patent No.: US 8,694,548 B2
(45) Date of Patent: Apr. 8, 2014

(54) DEFENSE-IN-DEPTH SECURITY FOR BYTECODE EXECUTABLES

(75) Inventors: Sreenivas Devalla, Union City, CA (US); Satyanarayana D V Raju, San Ramon, CA (US); Sridhararao V. Kothe, Bangalore (IN); Nakka Siva Kishore Kumar, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/334,587

(22) Filed: Dec. 22, 2011

(65) Prior Publication Data

US 2012/0173497 A1    Jul. 5, 2012

Related U.S. Application Data

(60) Provisional application No. 61/429,146, filed on Jan. 2, 2011.

(51) Int. Cl.
*G06F 7/00* (2006.01)
*G06F 17/00* (2006.01)

(52) U.S. Cl.
USPC ............................................. 707/798

(58) Field of Classification Search
USPC .................................. 707/698; 726/2, 19
See application file for complete search history.

(56) References Cited

U.S. PATENT DOCUMENTS

| | | | |
|---|---|---|---|
| 6,138,236 A * | 10/2000 | Mirov et al. .................... 726/26 |
| 7,533,422 B2 | 5/2009 | Matthews et al. |
| 7,574,450 B2 * | 8/2009 | Plouffe, Jr. ............................. 1/1 |
| 7,660,798 B1 * | 2/2010 | Ludwig et al. .................. 726/11 |
| 7,814,317 B1 | 10/2010 | Matthews et al. |
| 7,823,135 B2 * | 10/2010 | Horning et al. ............... 717/127 |
| 7,987,510 B2 * | 7/2011 | Kocher et al. ................... 726/27 |
| 8,412,945 B2 * | 4/2013 | Sweet et al. .................. 713/176 |
| 2002/0053020 A1 * | 5/2002 | Teijido et al. ................ 713/153 |
| 2003/0110396 A1 * | 6/2003 | Lewis et al. ................. 713/201 |
| 2004/0054907 A1 * | 3/2004 | Chateau et al. .............. 713/175 |
| 2004/0230949 A1 * | 11/2004 | Talwar et al. ................ 717/118 |
| 2005/0125407 A1 * | 6/2005 | Kraus et al. ....................... 707/8 |
| 2005/0210263 A1 * | 9/2005 | Levas et al. .................. 713/182 |
| 2006/0041761 A1 * | 2/2006 | Neumann et al. ............. 713/189 |
| 2006/0265446 A1 * | 11/2006 | Elgressy et al. ............. 709/200 |
| 2007/0204336 A1 * | 8/2007 | Teijido et al. .................. 726/10 |
| 2007/0283417 A1 * | 12/2007 | Smolen et al. ................... 726/2 |
| 2008/0125217 A1 * | 5/2008 | Pavlovski ..................... 713/169 |
| 2009/0094673 A1 * | 4/2009 | Seguin et al. ..................... 726/1 |
| 2009/0113110 A1 * | 4/2009 | Chen et al. ........................ 711/6 |
| 2009/0113111 A1 * | 4/2009 | Chen et al. ........................ 711/6 |
| 2009/0113424 A1 * | 4/2009 | Chen et al. ........................ 718/1 |
| 2009/0222674 A1 * | 9/2009 | Leichsenring et al. ....... 713/193 |
| 2009/0228718 A1 * | 9/2009 | Manferdelli et al. ......... 713/190 |
| 2009/0254572 A1 * | 10/2009 | Redlich et al. ................. 707/10 |
| 2009/0323972 A1 * | 12/2009 | Kohno et al. ................. 380/284 |

(Continued)

*Primary Examiner* — Robert Beausoliel, Jr.
*Assistant Examiner* — Nicholas Allen
(74) *Attorney, Agent, or Firm* — Edell, Shapiro & Finnan, LLC

(57) ABSTRACT

Defense-in Depth security defines a set of graduated security tasks, each of which performs a task that must complete before another task can complete. Only when these tasks complete successfully and in the order prescribed by Defense-in-Depth security criteria is a final process allowed to execute. Through such Defense-in-Depth security measures, vulnerable software, such as bytecode, can be verified as unaltered and executed in a secure environment that prohibits unsecured access to the underlying code.

21 Claims, 8 Drawing Sheets

(56) References Cited

U.S. PATENT DOCUMENTS

| | | |
|---|---|---|
| 2010/0174921 A1* | 7/2010 | Abzarian et al. .............. 713/193 |
| 2010/0250932 A1* | 9/2010 | Dill et al. ...................... 713/168 |
| 2011/0138465 A1* | 6/2011 | Franklin et al. ................. 726/23 |
| 2011/0145579 A1* | 6/2011 | Shin et al. ..................... 713/169 |
| 2011/0173693 A1* | 7/2011 | Wysopal et al. ................. 726/19 |
| 2011/0246778 A1* | 10/2011 | Duane .......................... 713/176 |
| 2011/0255690 A1* | 10/2011 | Kocher et al. ................. 380/210 |
| 2011/0282678 A1* | 11/2011 | Chapman ....................... 705/1.1 |
| 2012/0131638 A1* | 5/2012 | Bellwood et al. ................. 726/3 |
| 2012/0216242 A1* | 8/2012 | Uner et al. ........................ 726/1 |

* cited by examiner

DEFENSE-IN-DEPTH SECURITY FOR BYTECODE EXECUTABLES

RELATED APPLICATION DATA

The present application claims benefit of U.S. Provisional Patent Application 61/429,146 entitled, "Pari Encryption Framework for Encrypting Java Applications," filed on Jan. 2, 2011, the entire disclosure of which is incorporated herein by reference.

TECHNICAL FIELD

The present disclosure relates to data security through application of multiple security measures.

BACKGROUND

Interpreted executable code, such as bytecode, is notoriously vulnerable to malicious methods that override the intended behavior. As used herein, bytecode refers to instructions that are executed by way of interpretation, such as through a software interpreter or virtual machine. Such code can be de-compiled, by which underlying mechanisms, which may be secret, are revealed. Moreover, such code can be modified to invoke behavior on a target machine that is outside that which was intended by the author. While code obfuscation is often employed to hide programmed procedures, skilled programmers can, with some effort, trace the code through such obfuscation and ultimately derive the underlying processes.

DESCRIPTION OF EXAMPLE EMBODIMENTS

Overview

Defense-in-depth security assembles a collection of files that includes a file that is executable on a processor and another file that is executable through an interpretation process, such as a virtual machine. The executable file includes processor instructions that are native to the processor to execute a defense-in-depth process. The defense-in-depth process performs a sequence of tasks, the failure of any of which prohibits allocation of processor resources for the interpretation process. The interpreter-executable file may be provided to the interpretation process upon the allocation of the resources therefor.

Example Embodiments

Figure 1:
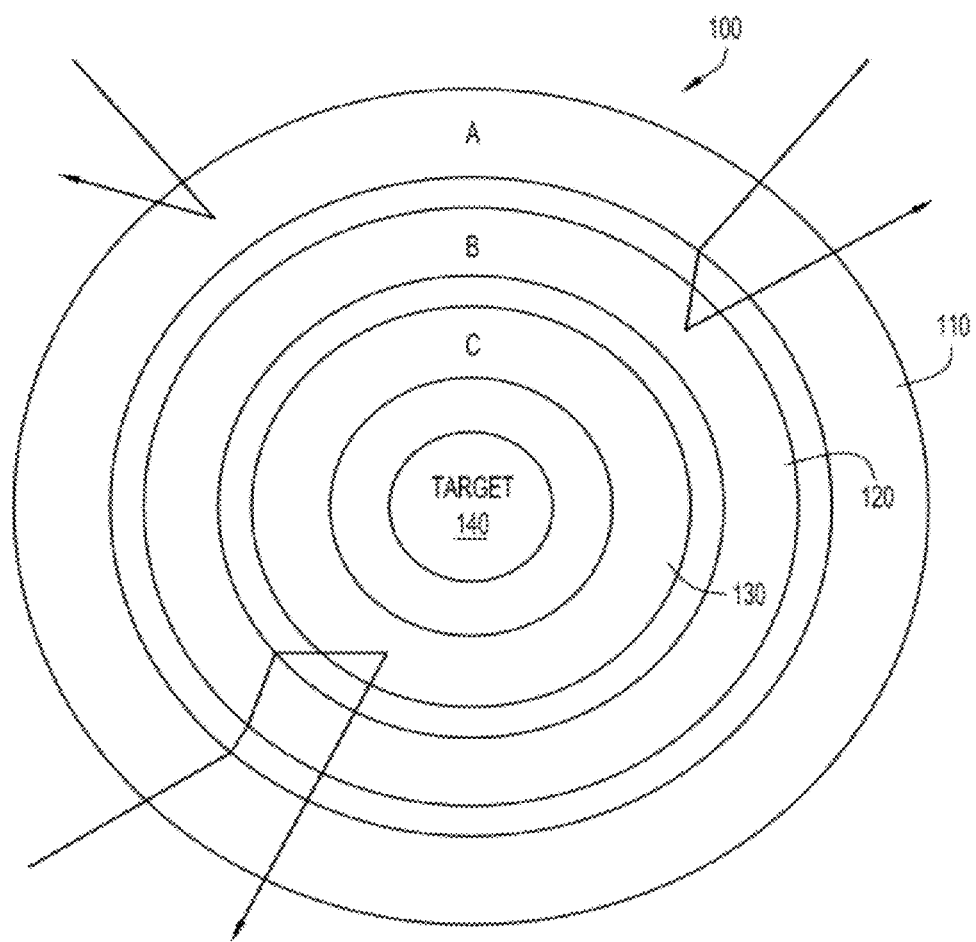
FIG. 1 is a diagram of defense-in-depth security.

Referring to FIG. 1, an abstraction of a defense-in-depth (DiD) security configuration 100 is illustrated. As used herein, defense-in-depth security refers to the coordinated application of security measures 110, 120, 130, such as, for example, encryption, data verification and encoding, conditional program execution, etc., by which access to code 140 of a target process is barred. Such access may be attempted for a wide variety of reasons, such as to implant malicious code, reverse-engineering of implemented processes, bypassing intellectual property protection, etc. For purposes of description, these techniques will be referred to herein generically as malicious access. As depicted by the annular arrangement of DiD security 100 illustrated in FIG. 1, security measures 110, 120, 130 are established such that if one measure is breached, such as security measure 110, additional measures 120 and 130 continue to provide protection and must also be breached to allow access to code 140. For greater security, measures 110, 120, 130 may each implement distinct security techniques to increase the likelihood that the required expertise to pierce all levels of security lies beyond that of a single individual, thereby increasing the amount of effort required.

Figure 2:
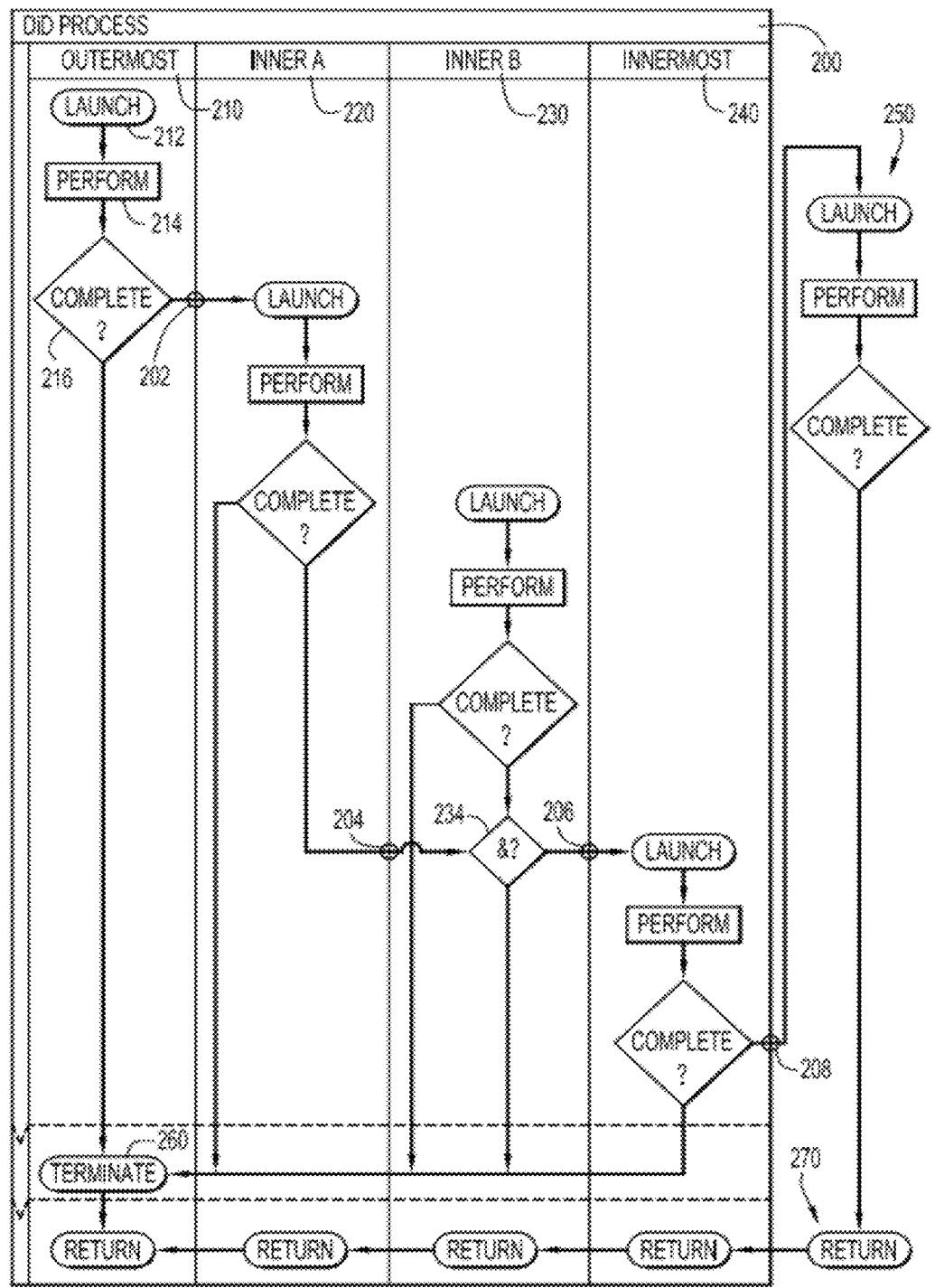
FIG. 2 is a flow diagram of a defense-in-depth security process.

FIG. 2 depicts an implementation of DiD security by which target code may be secured. As illustrated in the figure, DiD security may be carried out through a DiD process 200 implemented through execution of computer instructions on suitable data processing equipment. Execution flow of DiD process 200 may span more than one computer program and more than one mode of execution. DiD process 200 may comprise a plurality of security tasks, where, as used herein, a task is an execution path through a set of program instructions that are loaded in memory and executed to achieve a well-defined goal. A security task, or simply task, is said to be launched, as used herein, when the computer instructions of the task are loaded into the address space and executed. A task is completed, as used herein, upon achieving its predetermined goal, such as operating a computer process or environment into a predetermined state. When a task is terminated, as used herein, processor control is transferred to the operating system and processor resources are released regardless of whether the task has completed. Between its launch and its completion or termination, a task is said to be performing. Tasks may be launched, performed and completed concurrently with other tasks. In certain DiD security processes, the launching, performance and completion of tasks may be conditioned on the launching, performing and completion of other tasks.

The tasks of DiD process 200 may be graduated, i.e., the launching and performance of one task relies on the performance of another task. Such conditioning may establish that one task must complete its goal, e.g., operate the system into a predetermined processing state on which the launching, performance of another task is contingent. DiD security succeeds in prohibiting malicious access to code or unauthorized execution of target process 250 by requiring the graduated processes achieve respective goals in a sequence that ultimately establishes the conditions for successful launching and/or execution thereof.

In FIG. 2, DiD process 200 includes an outermost task 210, which is the first in a sequence of graduated tasks defined by DiD process 200. DiD process 200 may include further a first inner task 220, a second inner task 230 and an innermost task 240. Each task 210, 220, 230, 240 may include a launching stage, representatively illustrated at launching stage 212 and whereby the task is launched by the processor, a performance stage, representatively illustrated at performance stage 214 and whereby the task is performed, and a completion stage, representatively illustrated at completion stage 216 and whereby the task is completed. Each task in DiD process 200 may implement a security measure prohibiting malicious access to the code of process 250. For example, outermost task 210 may validate data and/or code providing services for process 250, inner task 220 may decode such data and/or code, inner task 230 may retrieve one or more keys, e.g., hash keys, encryption keys, etc., from the decoded data and innermost task 240 may decrypt the code by which target process 250 is executed with the decoded keys. It is to be understood that numerous security measures and task sequences may be used in conjunction with DiD security techniques described herein, as will be recognized and appreciated by those skilled in the data security art.

Completion of tasks 210, 220, 230, 240 places DiD process 200 in respective states 202, 204, 206, 208, a prescribed sequence of which must occur for target process 250 to be executed. If all tasks in DiD process 200 complete in the prescribed sequence, then target process 250 is allowed to execute to completion and, once such completion has been achieved, process 250 returns control to the system through a graceful exiting of DiD process 200, as illustrated at return operation 270. If, on the other hand, any one task fails to complete, DiD process 200 is terminated without proceeding beyond the point of failure, as illustrated at the termination operation 260. In certain implementations, a state of DiD process 200 may rely on completion of more than one task. For example, as illustrated in FIG. 2, the completion of outermost task 210 drives DiD process 200 into state 202, responsive to which inner tasks 220 and 230 are launched substantially simultaneously per the capabilities of the underlying processing platform. The completion of inner task 220, resulting in state 204, must coincide with the completion of inner task 230, as illustrated at decision block 234, in order to drive DiD process 200 into state 206.

Figure 3:
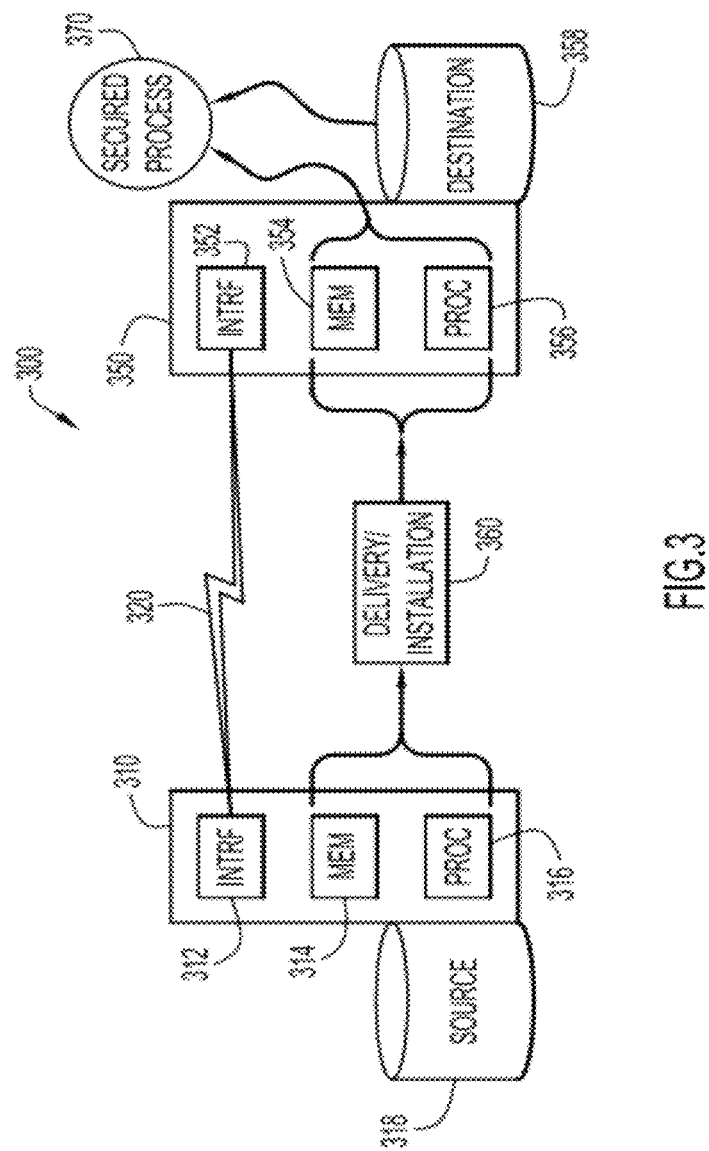
FIG. 3 is schematic block diagram of a communications network by which defense-in-depth security may be implemented.

A network 300, which may embody DiD security is illustrated in FIG. 3. Network 300 comprises a source data processing unit 310 and a destination data processing unit 350 communicatively coupled one with the other by a communication link 320. Source data processing unit 310 may include a network interface 312, processor memory 314, a processor 316 and a persistent storage unit 318. Similarly, destination data processing unit 350 may include a network interface 352, processor memory 354, a processor 356 and a persistent storage unit 358. The components and communication processes of network 300 may be fulfilled by numerous network technologies, the implementation details of which shall thus be omitted.

Network 300 may implement a data delivery/installation process 360 by which packaged data are downloaded over communication link 320 from source data processing unit 310 and installed on destination data processing unit 350. The ordinarily skilled artisan will recognize numerous such installation processes and DiD security can be achieved regardless of the techniques used. Data delivery/installation process 360 may download the data in a package from source data processing unit 310 to destination data processing unit 350, unpack the data at destination data processing unit 350, such as by decompression and decoding, into a predetermined file structure and/or in a prescribed unpacking sequence, and automatically launch a process, such as an implementation of DiD security process 200 described herein. When so implemented, certain files may be stored on persistent storage 358 in a secured state, such as by encryption, and be decrypted only from within DiD security process 200, thereby providing a secured process 370.

It is to be understood that data delivery from source to destination may be performed by means other than through communication link 320. For example, data delivery may be achieved by storing a data package on a portable memory device, such as a CD, DVD, flash memory or the like, and physically transporting the portable memory device to destination data processing unit 350.

Figure 4:
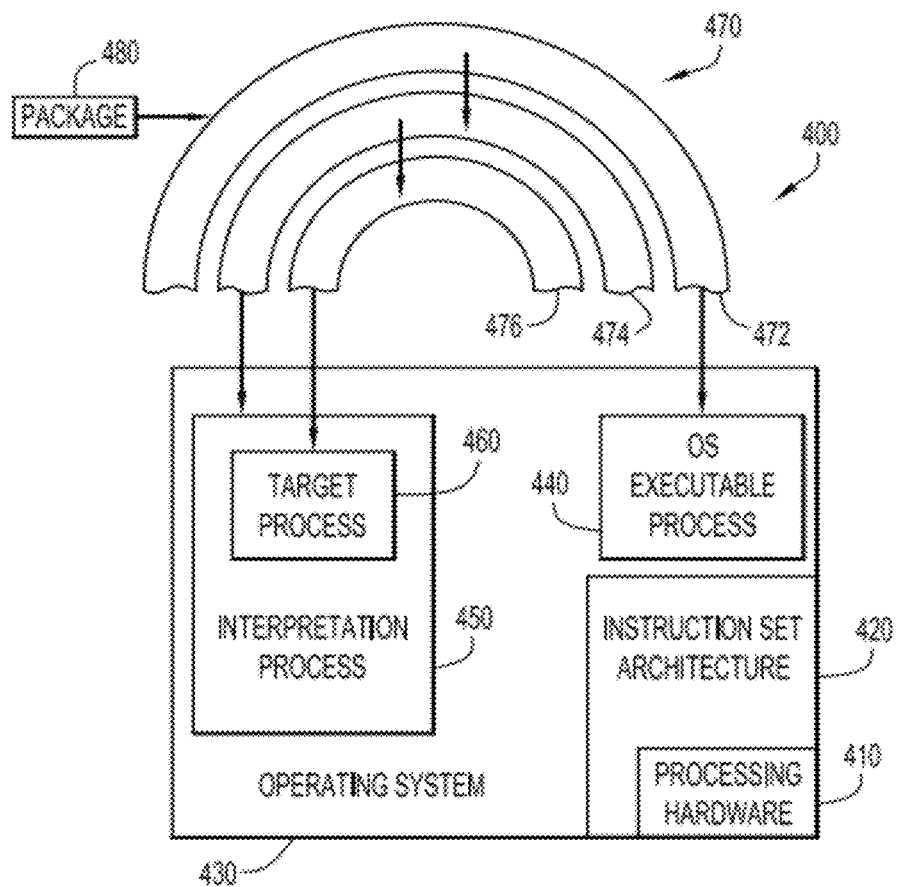
FIG. 4 is a diagram of a processor platform on which defense-in-depth security may be implemented.

In FIG. 4, an example computing platform 400 is illustrated, which may be referred to herein simply as platform 400, which includes processing hardware 410, instruction set architecture (ISA) 420, and operating system (OS) 430. Processing hardware 410 contains the necessary electronic circuitry for carrying out processing instructions provided thereto as electrical signals. ISA 420 provides an interface to processing hardware 410, by which suitably programmed machine code is converted to the afore-mentioned electrical signals and provided to the processing hardware 410. OS 430 provides common services to applications, which, as used herein, refers to any executable code comprising programmed processor instructions, referred to herein as software, compliant with OS 430 for execution. Applications or processes that can be executed directly under OS 430 are referred to herein as natively executable. For software that cannot be directly executed under OS 430, such as target process 460, an OS compliant software interpreter 450 may be executed, which, as used herein, refers to an application native to OS 430 that renders a non-native application executable. For example, target process 460 may comprise bytecode executable through interpretation process 450 that is executable only through software interpretation. When so embodied, target process 460 is considered portable, in that it can execute unaltered on different and distinct computing platforms 400, regardless of hardware 410, ISA 420 and OS 430 provided such platform implements interpreter 450.

DiD security system 470 may perform graduated security tasks 472, 474, 476 to extract and execute the bytecode of target process 460 from a binary package 480. As used herein, a binary package is a collection of data files assembled for delivery and in accordance with a predetermined DiD security process. In the DiD security example of FIG. 4, the various processes 440, 450 and 460 may be executed in a sequence defined by the tasks of DiD security process 470. When so implemented, target process 460 may be launched in interpretation process 450 only after all the prescribed security criteria have all been met.

Figure 5A:
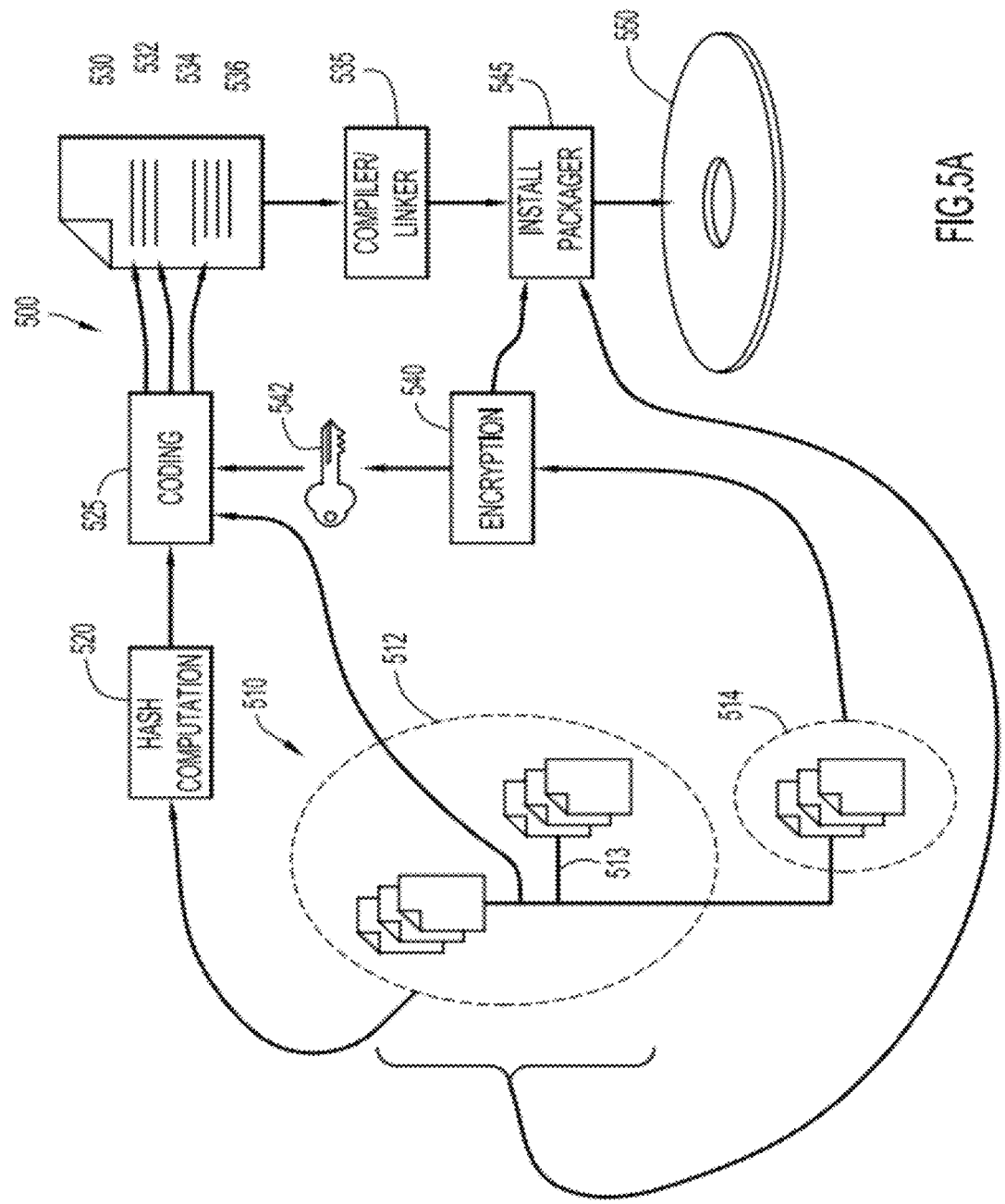
FIGS. 5A-5B is a functional flow diagram of a defense-in-depth security implementation.

FIG. 5A illustrates an example source packaging process 500 by which a binary package may be constructed in accordance with DiD security. A plurality of files that are to be packaged may be assembled into a file structure, such as hierarchical file structure 513 and stored at a source storage device for packaging. A description of the file structure 513 may be formed, such as to indicate a PATH environment variable, and may be provided to a coding process 525, whereby any readily readable textual data may be converted into non-textual data. Such coding may be achieved by a simple offset value added to ASCII values of the text to produce unprintable characters. However, other encoding techniques may be used as well.

Files 510 may include a set of supporting files 512, which may be software libraries and the like. In certain implementations, supporting files 512, while not necessarily requiring high data security, may nevertheless be vulnerable to tampering for the purposes of exposing protected bytecode. To ensure that delivered supporting files 512 have not been tampered with, each file in file set 512 may be provided to a hash computation process 520, such as by a computer implementation of the MD5 algorithm. Files 510 may additionally include a plurality of bytecode files 514 that are to be executed only in a secured environment. Bytecode files 514 may be provided to an encryption process 540, whereby the files are suitably encrypted, such as through a computer implementation of the Advanced Encryption Standard (AES). The encryption key 542 may be encoded by coding process 525 so as to be converted into unreadable data.

The encoded hash keys, encryption key and file structure description may be provided to a source code file 530 that is compliant with a computer programming language, such as C. In addition to the encoded keys and file structure, source code file 530 may include obfuscation measures, such as dummy constants of readable strings, representatively illustrated at line 532. Source code file 530 may include software code by which control of DiD security process is achieved, such as by suitably programmed instructions to perform specific security tasks and to establish the order in which such security tasks should be executed. Source code file 530 may be provided to a compiler/linker 535 to generate natively executable instructions that may be automatically launched upon installation at the destination end. The native code, encrypted bytecode files 514 and supporting files 512 may be provided to an installation packaging process 545, and the binary package resulting therefrom may be stored on a tangible medium 550 for delivery.

Figure 6A:
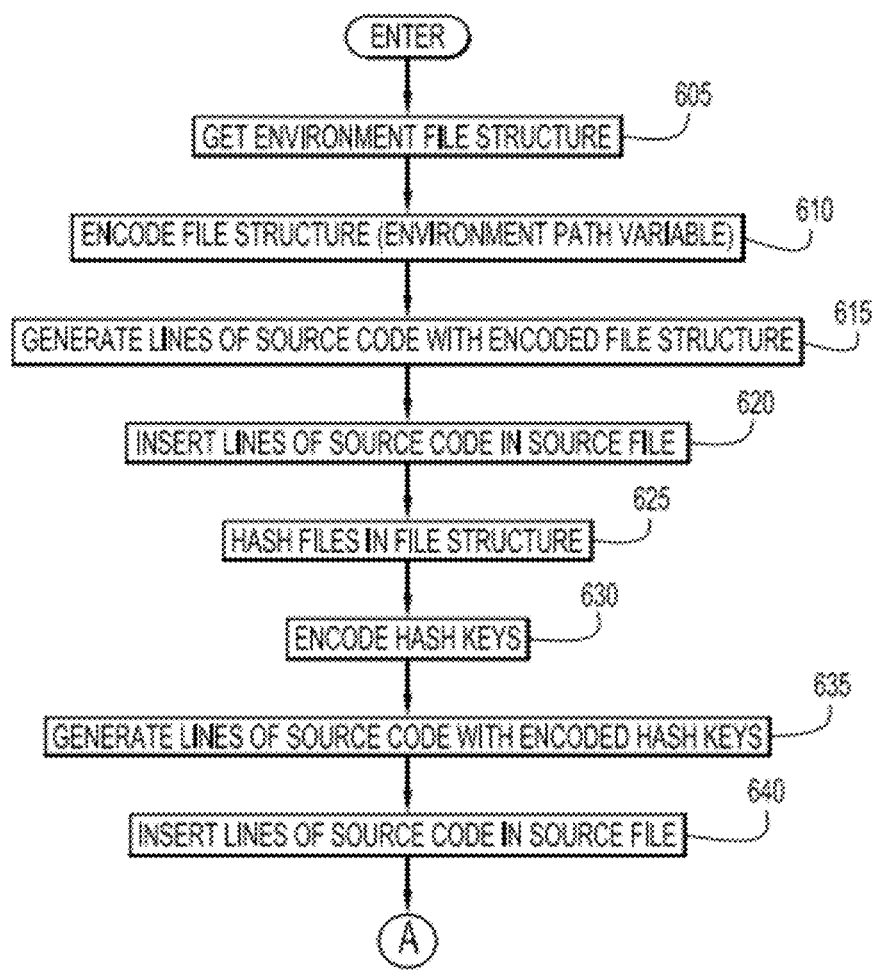
FIG. 6 is a flow diagram of a source code generation process that may be used in conjunction with defense-in-depth security.
Figure 6B:
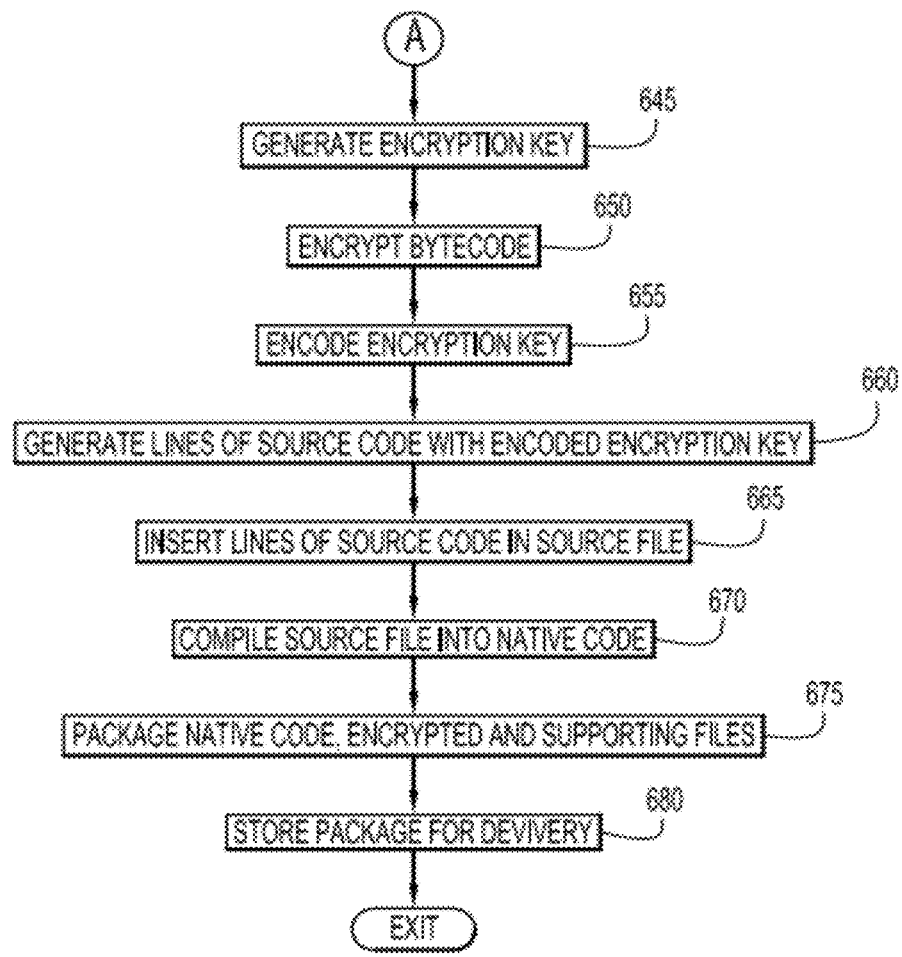

FIG. 6 is a flow diagram of an automated process 600 by which source code file 530 may be constructed. A template of source code file 530 may be pre-generated to include suitably programmed instructions for carrying out various generic tasks of a DiD security process. Files for delivery may assembled into a file structure 513 from which the automated process 600 receives the necessary information. In operation 605, a description of the file structure 513 is generated, such as through a PATH variable format and may be encoded by coding process 525 in operation 610. Lines of source code may be generated in operation 615, such as through a pre-formatted constant declaration, and inserted into the source file at an appropriate location therein in operation 620. In operation 625, a hash key for each supporting file in the file structure 513 is computed and encoded in operation 630. Suitable source code statements may be generated in operation 635 and inserted into the source file in operation 640. In operation 645, an encryption key may be generated and bytecode files 514 may be encrypted in operation 650. The encryption keys may be encoded through coding process 525 in operation 655, suitably constructed source code statements may be generated in operation 660 and inserted into the source code file in operation 665. In operation 670, the source code file is compiled and linked into natively executable code and the native code, encrypted bytecode files and supporting files may be packaged in operation 675. The package may be stored for delivery in operation 680.

Figure 5B:
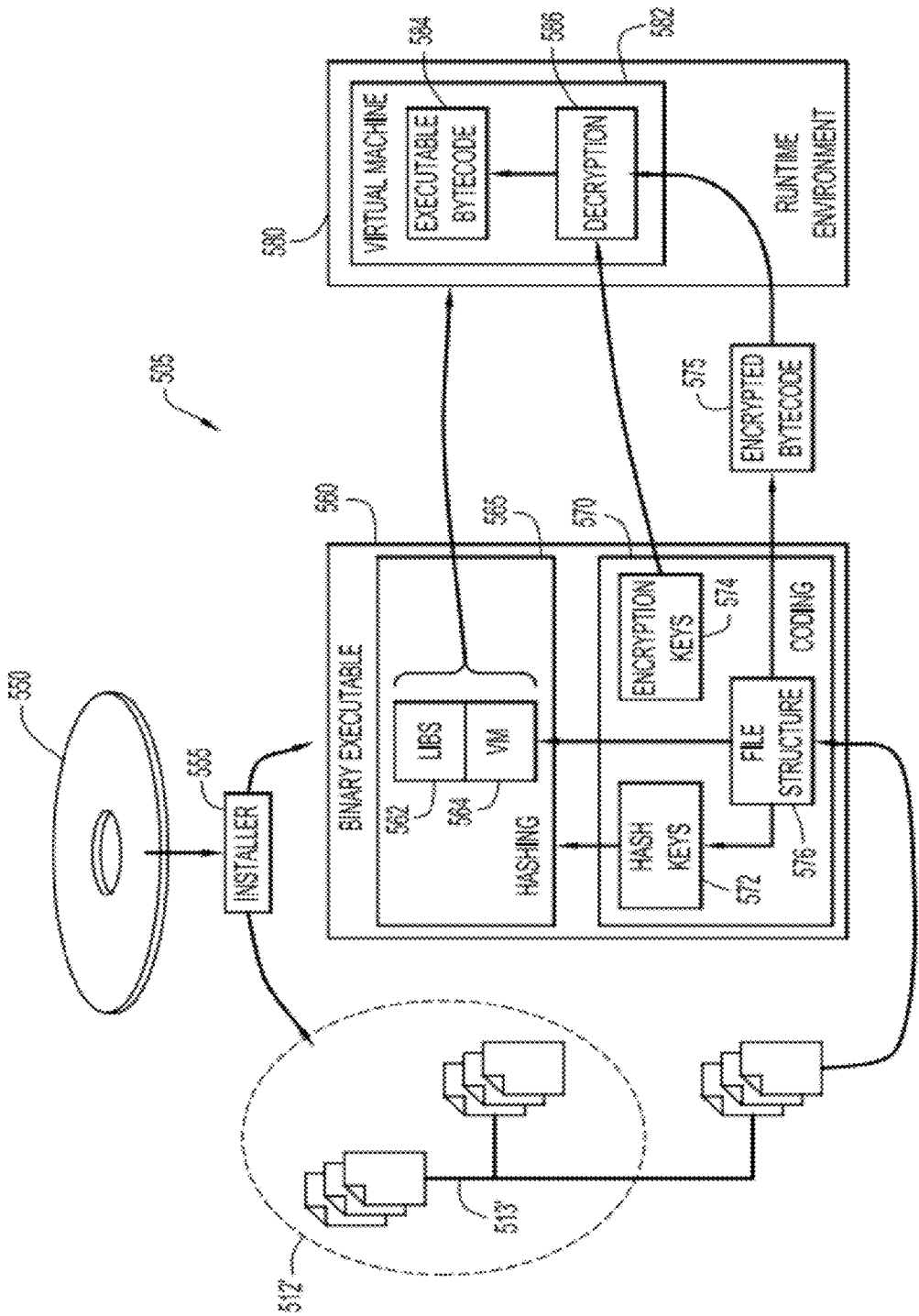

FIG. 5B illustrates an example DiD security process 505 that is complementary to the packaging process 500 described with reference to FIG. 5A. A binary package may be delivered on medium 550 or through the communication network configuration illustrated in FIG. 3. The binary package is installed on a storage device, such as storage unit 358 in FIG. 3, so as to unpack file structure 513' and the natively executable file 560. As previously described, natively executable file 560 includes encoded hash keys 572, encryption keys 574 and PATH variable 576. Installer 555 may execute the natively executable code 560 to launch the DiD security process 505.

As an example outermost task, the hash values for supporting files 512' may be computed, representatively illustrated in block 565, and compared with hash keys 572. Upon a determination that supporting files 512' are indeed unaltered duplicates of supporting files 512, DiD security process 505 may transition into a state in which an inner task may be performed. In the example of FIG. 5B, the first inner task may be launched to instantiate a runtime environment 580 and virtual machine 582 from virtual machine code 564 and supporting library code 562. Runtime environment 580 and virtual machine 582 may be implemented in any number of virtual computing environment techniques, such as through JAVA runtime environment (JRE). If runtime environment 580 is successfully established, a decryption process 586 may be launched within the virtual machine 582. In certain implementations, such as through JRE, such decryption process 586 may be launched by providing suitable parameters to include encryption key 574 when instantiating virtual machine 582. Upon determining that decryption process 586 is successfully launched in virtual machine 582, DiD security process 505 may transition into a next state in which an innermost task may be performed. Such a task may be launched to provide the encrypted bytecode 575 to decryption process 586, whereby the decrypted bytecode 584 may be executed within virtual machine 582 as the target process.

It is to be noted and appreciated that bytecode 584 is decrypted within the virtual machine 582 that was instantiated only after the graduated tasks of DiD security process 505 completed in a prescribed sequence. That is, the executable byte code 584 is decrypted within runtime environment 580, the security of which is ensured via DiD security process 505. Moreover, the bytecode, when external to runtime environment 580, is stored as an encrypted file, thus protecting vulnerable bytecode from malicious access.

Binary package constructed in accordance with DiD security described herein may be stored on and transferred through read only memory (ROM), random access memory (RAM), magnetic disk storage media devices, optical storage media devices, flash memory devices, electrical, optical, or other physical/tangible memory storage devices. Processing platform 400, which may form a portion of source data processing unit 310 and/or destination data processing unit 350 is, for example, a microprocessor or microcontroller that executes instructions for the DiD security logic as well as the installation and packaging logic discussed herein. Thus, in general, the memory representatively illustrated by medium 550 may comprise one or more tangible (e.g., non-transitory) computer readable storage media (e.g., a memory device) encoded with software comprising computer executable instructions and when the software is executed (by the processor 140) it is operable to perform the operations described herein in connection with DiD security processes.

The above description is intended by way of example only.

What is claimed is:

1. A method comprising:
    assembling a plurality of files to include a file natively executable on a processor to perform a defense-in-depth process and a non-native executable file executable on the processor only through an interpretation process, wherein the interpretation process provides an environment in which to execute the non-native executable file;
    executing the defense-in-depth process on the processor to perform a prescribed sequence of security tasks, with the launching and performance of a subsequent security task relying upon completion of a preceding security task, and failure to complete any one of which prohibits allocation of processor resources to the interpretation process; and
    providing the non-native executable file to the interpretation process for execution, contingent upon completion of specific security tasks in the prescribed sequence of security tasks, to execute a target process on the processor upon which the processor resources are being allocated.

2. The method of claim 1, wherein assembling the files includes:
computing a hash key for each of a set of the files; and
storing the hash key for each of the files in the natively executable file.

3. The method of claim 2, wherein executing the defense-in-depth process includes:
performing as one of the tasks:
computing the hash key for each of the files at a destination processor on which the defense-in-depth process executes; and
comparing the hash key computed at the destination with the corresponding hash key stored in the natively executable file; and
terminating the defense-in-depth process upon the comparison revealing a mismatch of any hash key.

4. The method of claim 3, wherein assembling the files includes:
including natively executable processor instructions in the set of the files that, when executed by the destination processor, executes a virtual machine as the interpretation process;
and wherein executing the defense-in-depth process includes:
instantiating the virtual machine upon the comparison revealing a match of all hash keys.

5. The method of claim 4, wherein assembling the files includes:
encrypting the non-native executable file with an encryption key; and
storing the encryption key in the natively executable file.

6. The method of claim 5, wherein executing the defense-in-depth process includes:
providing the encryption key to a decryption process executing in the virtual machine; and
decrypting the non-native executable file in the virtual machine.

7. The method of claim 6, wherein providing the non-native executable file includes:
executing instructions in the non-native executable file in the virtual machine subsequent to the decryption thereof.

8. The method of claim 7, wherein assembling the files includes:
generating text compliant with a computer programming language descriptive of the hash key for each of the set of files and the encryption key;
storing the generated text in a source code file with other text defining the defense-in-depth process; and
compiling the source code into the natively executable file.

9. The method of claim 8, wherein assembling the files includes:
establishing a predetermined file structure for the files;
generating additional text compliant with the computer programming language descriptive of the file structure;
storing the additional text in the source code file; and
compiling the source code into the natively executable file.

10. An apparatus comprising:
a source memory to store a plurality of files;
a destination memory to store the files as assembled and delivered in a data package; and
a processor communicatively coupled to the destination memory and configured to:
accept the data package and store a set of the files therefrom in the destination memory;
execute a set of processor instructions of a defense-in-depth process to perform a prescribed sequence of security tasks, with the launching and performance of a subsequent security task relying upon completion of a preceding security task, and failure to complete any one of which prohibits allocation of processor resources to an interpretation process; and
provide a bytecode file to the interpretation process for execution, contingent upon completion of specific security tasks in the prescribed sequence of security tasks by the defense-in-depth process, to execute a target process on the processor upon which the processor resources are being allocated.

11. The apparatus of claim 10, further comprising a source processor communicatively coupled to the source memory and configured to:
compute a hash key for each of a set of the files; and
store the hash key for each of the files in a natively executable file containing the processor instructions of the defense-in-depth process.

12. The apparatus of claim 11, wherein the processor is further configured to:
compute the hash key values for each of the files;
compare the computed hash key value with the corresponding hash key stored in the natively executable file; and
terminate the defense-in-depth process upon the comparison revealing a mismatch of any hash key.

13. The apparatus of claim 12, wherein the source processor is further configured to:
including processor instructions in the set of the files that, when executed by the processor, executes a virtual machine as the interpretation process; and
instantiating the virtual machine upon the comparison revealing a match of all hash keys.

14. The apparatus of claim 13, wherein the source processor is further configured to:
encrypt the byte code file with an encryption key; and
store the encryption key in the natively executable file.

15. The apparatus of claim 14, wherein the processor is further configured to:
provide the encryption key to a decryption process executing in the virtual machine; and
decrypt the bytecode file in the virtual machine.

16. The apparatus of claim 15, wherein the processor is further configured to:
execute instructions in the bytecode file in the virtual machine subsequent to the decryption thereof.

17. The apparatus of claim 16, wherein the source processor is further configured to:
generate text compliant with a computer programming language descriptive of the hash key for each of the set of files and the encryption key;
store the generated text in a source code file with other text defining the defense-in-depth process; and
compile the source code into the natively executable file.

18. A non-transitory computer readable medium having instructions encoded thereon that, when executed by a processor, are operable to cause the processor to:
accept a data package and store a set of files therefrom in a destination memory;
execute a defense-in-depth process to perform a prescribed sequence of security tasks, with the launching and performance of a subsequent security task relying upon completion of a preceding security task, and failure to complete any one of which prohibits allocation of processor resources to an interpretation process; and
provide a bytecode file to the interpretation process for execution, contingent upon completion of specific security tasks in the prescribed sequence of security tasks by the defense-in-depth process, to execute a target process on the processor upon which the processor resources are being allocated.

19. The non-transitory computer readable medium of claim 18, and further comprising instructions operable to:
retrieve a natively executable file and an encrypted bytecode file from the set of files;
retrieve from the natively executable file an encryption key;
launch a virtual machine as the interpretation process; and
decrypt the encrypted bytecode file within the virtual machine.

20. The non-transitory computer readable medium of claim 18, further comprising instructions operable to store the data package.

21. The non-transitory computer readable medium of claim 18, further comprising instructions operable to:
compute a hash key for each of a set of the files from the data package;
encrypt the bytecode file with an encryption key;
generate text compliant with a computer programming language descriptive of the hash key for each of the set of the files and the encryption key;
store the generated text in a source code file with other text defining the defense-in-depth process; and
compile the source code into a natively executable file.

\* \* \* \* \*